United States Patent [19]
Ogawa

[11] Patent Number: 6,084,567
[45] Date of Patent: *Jul. 4, 2000

[54] IMAGE DISPLAYING METHOD AND APPARATUS

[75] Inventor: Eiji Ogawa, Kanagawa-ken, Japan

[73] Assignee: Fuji Photo Film Co., Ltd, Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,247

[22] Filed: Nov. 25, 1996

[30] Foreign Application Priority Data

Nov. 28, 1995 [JP] Japan ................................. 7-309035
Jun. 27, 1996 [JP] Japan ................................. 8-167155

[51] Int. Cl.[7] ....................................................... G09G 5/10
[52] U.S. Cl. .............................. 345/147; 345/75; 345/11
[58] Field of Search .............................. 345/208, 74, 75, 345/55, 147, 10–21; 313/495, 496, 497, 421, 422, 437; 315/169.1, 169.2

[56] References Cited

U.S. PATENT DOCUMENTS 5,202,674  4/1993  Takemori et al. ...................... 313/422
5,260,873  11/1993  Hishinuma ............................... 345/11
5,302,964  4/1994  Lewins ..................................... 345/14

FOREIGN PATENT DOCUMENTS

28-7553    11/1987  Japan .
11-00842   4/1989   Japan .
11-00843   4/1989   Japan .
WO 85/05491  12/1985  WIPO .

*Primary Examiner*—Dennis-Doon Chow
*Attorney, Agent, or Firm*—Sughrue, Mion, Zinn, Macpeak & Seas, PLLC

[57] ABSTRACT

A gradation converting process is carried out on an image signal and in accordance with a predetermined gradation converting table, and a visible image, which is represented by an image signal having been obtained from the gradation converting process, is displayed on an image displaying device. In the gradation converting process, the amount of depletion of luminance of the image displaying device is detected, and the gradation converting table is corrected in accordance with the detected amount of depletion of luminance such that the depletion of luminance of the image displaying device may be compensated for. A visible image having good image quality is thereby displayed on the image displaying device regardless of depletion of luminance of the image displaying device.

6 Claims, 8 Drawing Sheets

FIG. 6B $\gamma' < \gamma\text{org}$      $\gamma' = \gamma\text{org}$     $\gamma' < \gamma\text{org}$
$L' < L\text{org}$      $L' < L\text{org}$     $L' < L\text{org}$

IMAGE DISPLAYING METHOD AND APPARATUS

BACKGROUND OF THE INVENTION

1. Field of the Invention

This invention relates to an image displaying method and apparatus for displaying an image on an image displaying means, such as a CRT display device or a liquid crystal displaying device. This invention particularly relates to an image displaying method and apparatus, wherein a gradation converting process is carried out on an image signal and in accordance with a predetermined gradation converting table, and a visible image, which is represented by an image signal having been obtained from the gradation converting process, is displayed on an image displaying means.

2. Description of the Prior Art

Heretofore, in cases where an image is displayed on an image displaying means, such as a CRT display device or a liquid crystal displaying device, a gradation converting table for converting the gradation characteristics of the image displaying means (i.e., the relationship between the image signal value and the logarithmic value of the luminance on the image displaying means) into linear characteristics is prepared. A gradation converting process is then carried out on the image signal and in accordance with the gradation converting table. A visible image, which is represented by the image signal having been obtained from the gradation converting process, is displayed on the image displaying means.

Figure 8A:
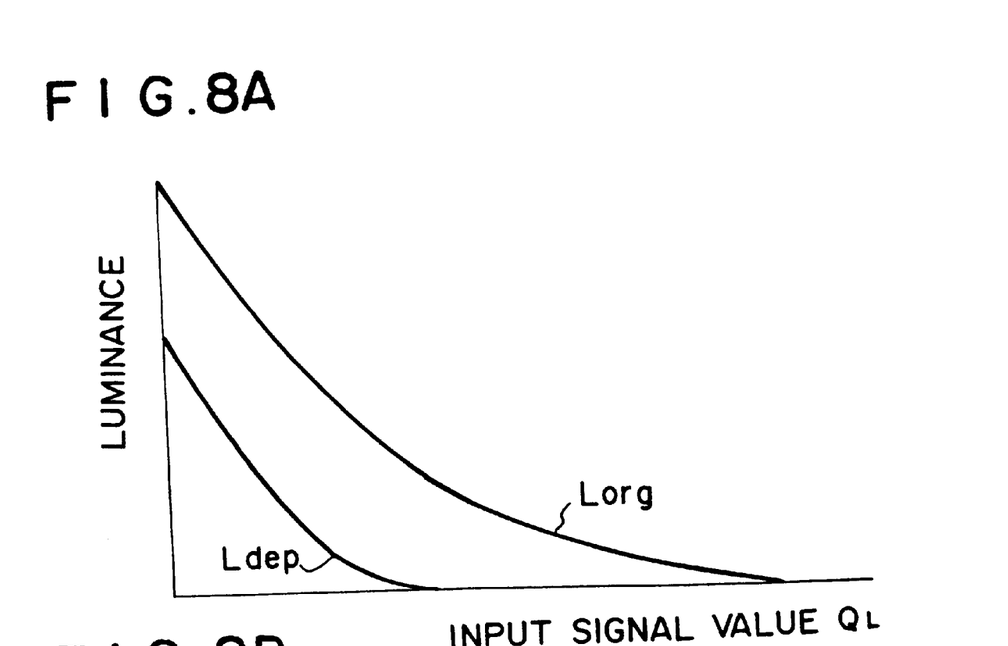
FIG. 8A is a graph showing how the luminance characteristics of a CRT display device are depleted due to deterioration of the CRT display device.
Figure 8B:
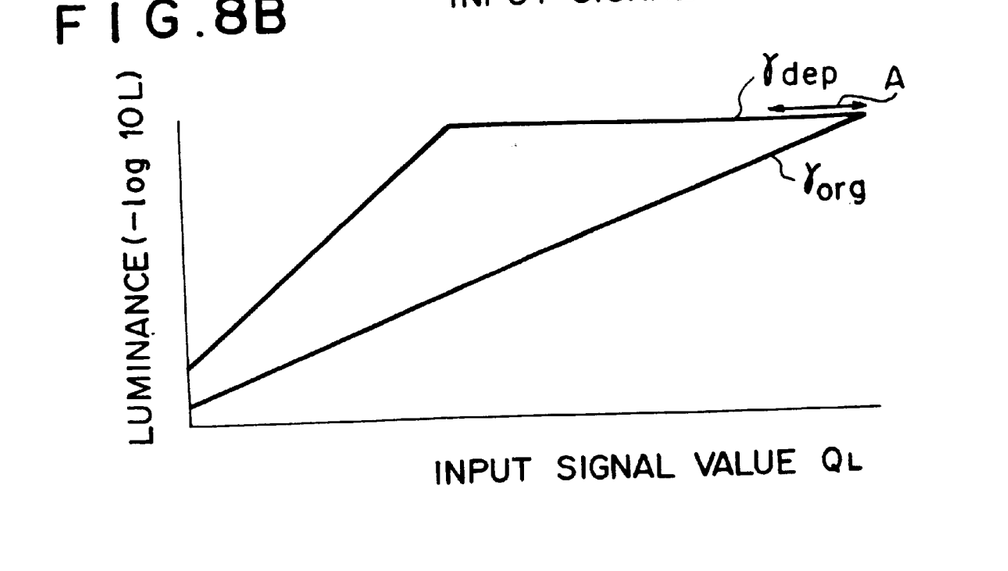
FIG. 8B is a graph showing how the gradation characteristics of a CRT display device are depleted due to deterioration of the CRT display device.

However, it often occurs that the luminance of the image displaying means is depleted due to deterioration of the display surface of the image displaying means (for example, the fluorescent screen of a CRT display device), deterioration of an electron gun used for carrying out light emission display (or back light in a liquid crystal display device). FIG. 8A shows the luminance characteristics representing the relationship between the image signal and the luminance of the image displaying means. In FIG. 8A, Lorg represents the luminance characteristics before being depleted, and Ldep represents the luminance characteristics after being depleted. As illustrated in FIG. 8A, in cases where the luminance of the image displaying means is depleted, even if the same level of voltage is applied to the image displaying means, the same level of luminance as the original level of luminance cannot be obtained. As illustrated in FIG. 8B, if the luminance of the image displaying means is thus depleted, in cases where the gradation converting process is carried out on the image signal and in accordance with the gradation converting table, the gradation characteristics γorg before being depleted cannot be obtained on the image displaying means, and the visible image will be reproduced with the gradation characteristics γdep after being depleted. With the gradation characteristics γdep after being depleted, the contrast of a high image density portion (i.e., a low luminance portion) A cannot be reproduced, and details of the portion A become imperceptible. If the portion of the low luminance (the high image density) in the image is not reproduced, the problems will occur in that the image information is lost, and the feeling of the image becomes different from the correct feeling.

SUMMARY OF THE INVENTION

The primary object of the present invention is to provide an image displaying method, with which a visible image having good image quality is displayed on an image displaying means regardless of depletion of luminance of the image displaying means.

Another object of the present invention is to provide an apparatus for carrying out the image displaying method.

The present invention provides an image displaying method, wherein a gradation converting process is carried out on an image signal and in accordance with a predetermined gradation converting table, and a visible image, which is represented by an image signal having been obtained from the gradation converting process, is displayed on an image displaying means, the method comprising the steps of:

i) detecting an amount of depletion of luminance of the image displaying means, and ii) correcting the gradation converting table in accordance with the detected amount of depletion of luminance such that the depletion of luminance of the image displaying means may be compensated for.

The present invention also provides an image displaying apparatus, wherein a gradation converting process is carried out on an image signal and in accordance with a predetermined gradation converting table, and a visible image, which is represented by an image signal having been obtained from the gradation converting process, is displayed on an image displaying means, the apparatus comprising:

i) a detection means for detecting an amount of depletion of luminance of the image displaying means, ii) a storage means for storing information representing at least a single corrected gradation converting table, which has been determined previously in accordance with the amount of depletion of luminance, and iii) a selection means for selecting a corrected gradation converting table from the storage means and in accordance with the detected amount of depletion of luminance.

In the image displaying method and apparatus in accordance with the present invention, the corrected gradation converting table should preferably have characteristics for converting the gradation of the image signal such that the image information represented by a predetermined level of the image signal may be displayed on the image displaying means and with approximately the same level of gradation as the level of gradation, which is displayed on the image displaying means before the luminance of the image displaying means is depleted. Also, the corrected gradation converting table should preferably have characteristics for converting the gradation of the image signal such that the gradation of the image signal displayed on the image displaying means may become linear over the entire range of the image signal.

The image displaying means may be a light emission display means, such as a CRT display device, a liquid crystal display device, or the like.

With the image displaying method and apparatus in accordance with the present invention, the amount of depletion of luminance of the image displaying means, such as a CRT display device or a liquid crystal display device, is detected. The gradation converting table is then corrected in accordance with the detected amount of depletion of luminance such that the depletion of luminance of the image displaying means may be compensated for. Therefore, the image represented by the image signal can be displayed on the image displaying means and with the gradation which results from the compensation for the depletion of luminance of the image displaying means. Accordingly, even if the image displaying means deteriorates, an image having good image quality with corrected gradation can be reproduced on the image displaying means.

Also, as described above, with the image displaying method and apparatus in accordance with the present invention, the corrected gradation converting table, which is obtained by correcting the gradation converting table, may have the characteristics for converting the gradation of the image signal such that the image information represented by a predetermined level of the image signal may be displayed on the image displaying means and with approximately the same level of gradation as the level of gradation, which is displayed on the image displaying means before its luminance is depleted. In such cases, the image information represented by the predetermined level of the image signal can be displayed with approximately the same level of gradation as the level of gradation, which is displayed on the image displaying means before the luminance of the image displaying means is depleted.

Further, with the image displaying method and apparatus in accordance with the present invention, as described above, the corrected gradation converting table may have the characteristics for converting the gradation of the image signal such that the gradation of the image signal displayed on the image displaying means may become linear over the entire range of the image signal. In such cases, though the contrast of the entire area of the reproduced image becomes low, the image information represented by the entire image signal can be displayed with the same level of contrast. Therefore, the loss of the image information can be kept small.

DESCRIPTION OF THE PREFERRED EMBODIMENTS

The present invention will hereinbelow be described in further detail with reference to the accompanying drawings.

Figure 1:
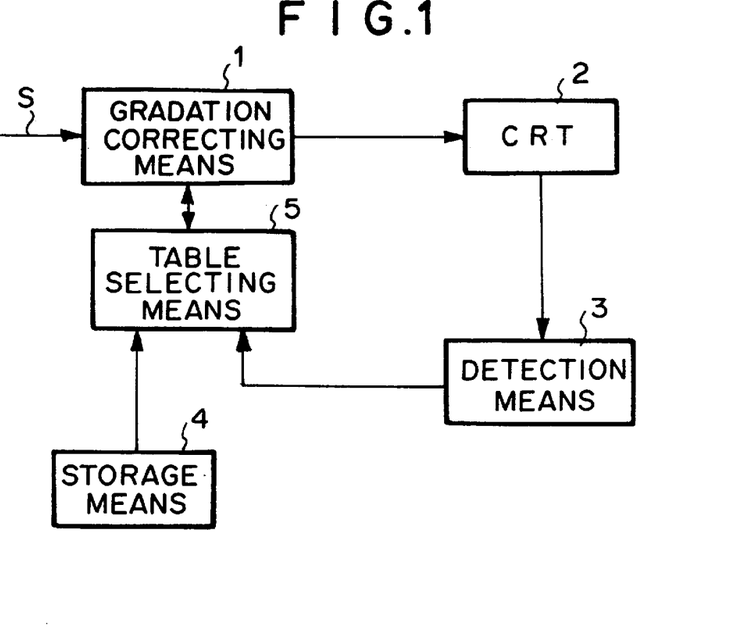
FIG. 1 is a block diagram showing an embodiment of the image displaying apparatus in accordance with the present invention.

FIG. 1 is a block diagram showing an embodiment of the image displaying apparatus in accordance with the present invention, which is used to display a medical image. The image displaying apparatus comprises a gradation correcting means 1 for correcting the gradation of an image signal S, and a CRT display device 2 serving as the image displaying means for displaying an image, which is represented by the image signal having been obtained from the correction of gradation carried out by the gradation correcting means 1. The image displaying apparatus also comprises a detection means 3 for detecting the amount of depletion of luminance of the CRT display device 2, and a storage means 4 for storing information representing a plurality of corrected gradation converting tables, which have been determined previously in accordance with the amount of depletion of luminance of the CRT display device 2. The image displaying apparatus further comprises a table selecting means 5 for selecting a desired corrected gradation converting table from the plurality of the corrected gradation converting tables, which have been stored in the storage means 4, in accordance with the amount of depletion of luminance of the CRT display device 2, which amount of depletion has been detected by the detection means 3.

In an ordinary gradation converting process, the image signal S is firstly fed into the gradation correcting means 1. In the gradation correcting means 1, the gradation converting process is carried out on the image signal S and in accordance with the gradation converting table, which is indicated by the broken line in the fourth quadrant in FIG. 2. The image signal S is further converted in accordance with the gradation characteristics of the CRT display device 2, which are indicated by the broken line in the first quadrant in FIG. 2. A visible image represented by the image signal, which has been obtained in this manner, is reproduced and displayed on the CRT display device 2. The visible image displayed on the CRT display device 2 has the gradation characteristics indicated by the broken line in the second quadrant in FIG. 2.

Figure 3:
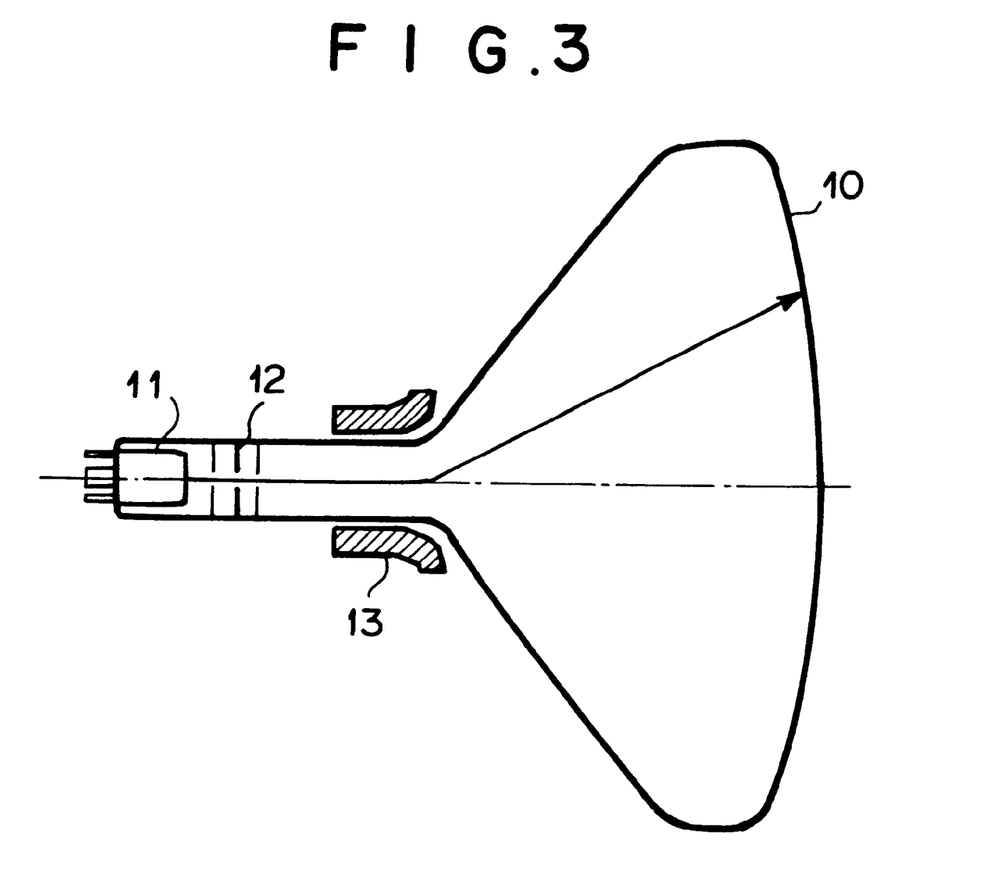
FIG. 3 is a schematic view showing a CRT display device serving as the image displaying means in the image displaying apparatus in accordance with the present invention.

How the image displaying apparatus in accordance with the present invention operates will be described hereinbelow. Firstly, the amount of depletion of luminance of the CRT display device 2 is detected by the detection means 3. The detection of the amount of depletion of luminance is carried out in the manner described below. FIG. 3 is a schematic view showing the CRT display device 2. As illustrated in FIG. 3, in the CRT display device 2, an electron beam is produced by an electron gun 11 and accelerated by a grid 12. The electron beam is then deflected by a deflection yoke 13 and caused to impinge upon a fluorescent screen 10.

The fluorescent screen 10 is thereby caused to emit light in proportion to the intensity of the electron beam. Depletion of luminance of the CRT display device 2 is primarily caused to occur by deterioration of the electron gun 11 (principally cathode emission). Deterioration of the cathode can be monitored by detecting a decrease in the anode current amount (which is approximately equal to the cathode current amount). Therefore, depletion of luminance of the CRT display device 2 can be monitored by always monitoring the anode current amount (which is approximately equal to the cathode current amount). In this embodiment, the amount of depletion of luminance of the CRT display device 2 is detected by comparing the anode current value, which corresponds to the picture element value representing the maximum luminance value, and its initial value with each other.

Figure 4A:
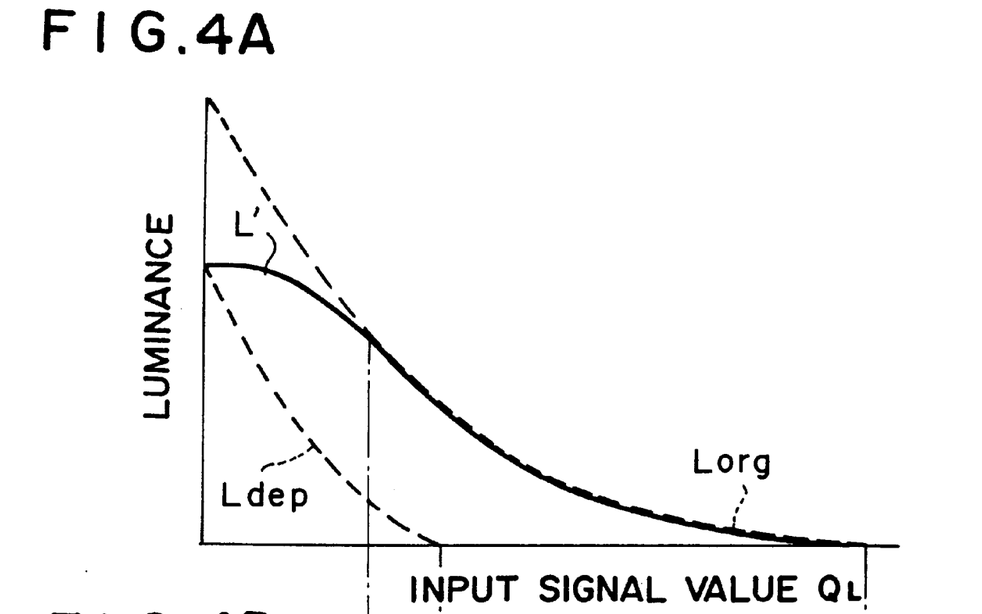
FIG. 4A is a graph showing an example of luminance characteristics of a CRT display device after being converted in accordance with a corrected gradation converting table.
Figure 4B:
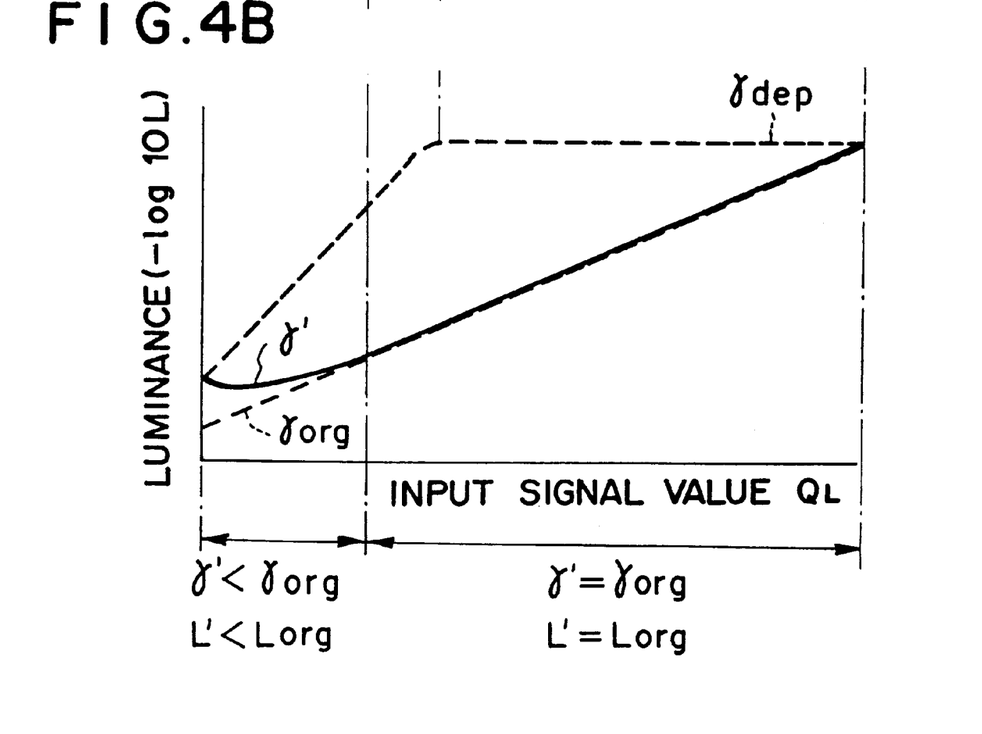
FIG. 4B is a graph showing an example of gradation characteristics of the CRT display device after being converted in accordance with the corrected gradation converting table.
Figure 5A:
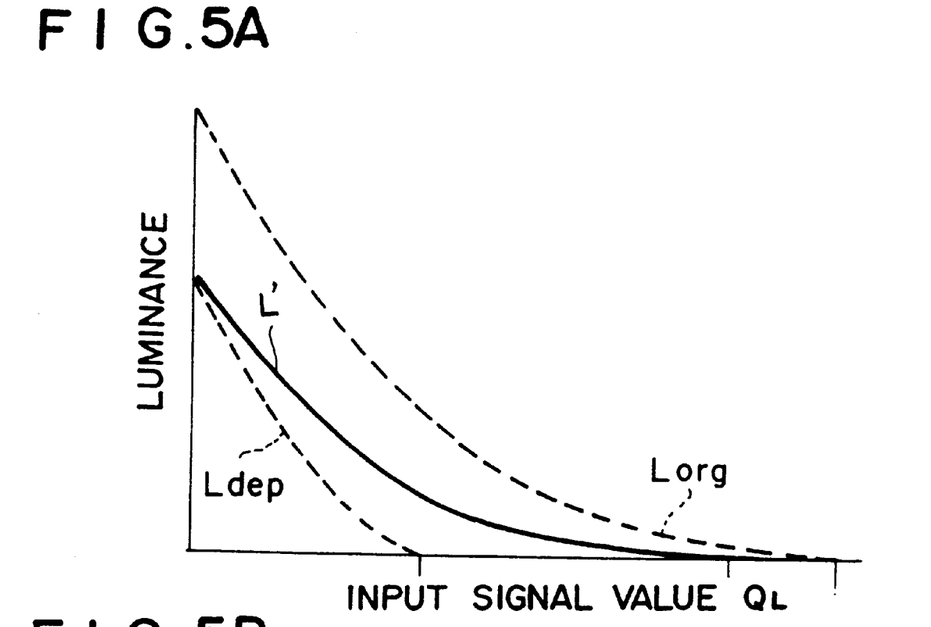
FIG. 5A is a graph showing a different example of luminance characteristics of a CRT display device after being converted in accordance with a corrected gradation converting table.
Figure 5B:
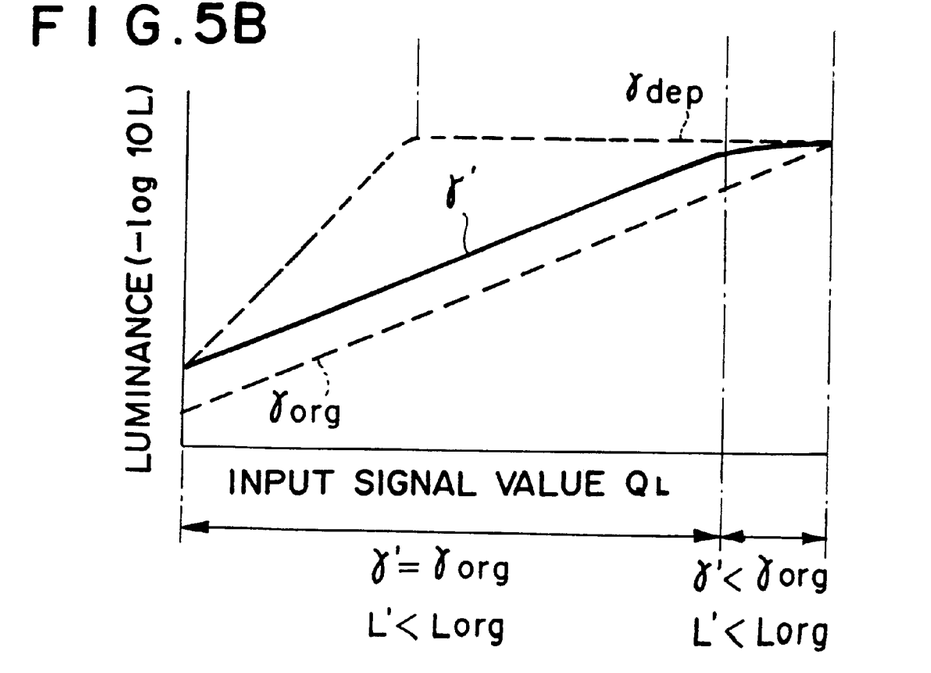
FIG. 5B is a graph showing a different example of gradation characteristics of the CRT display device after being converted in accordance with the corrected gradation converting table.
Figure 6A:
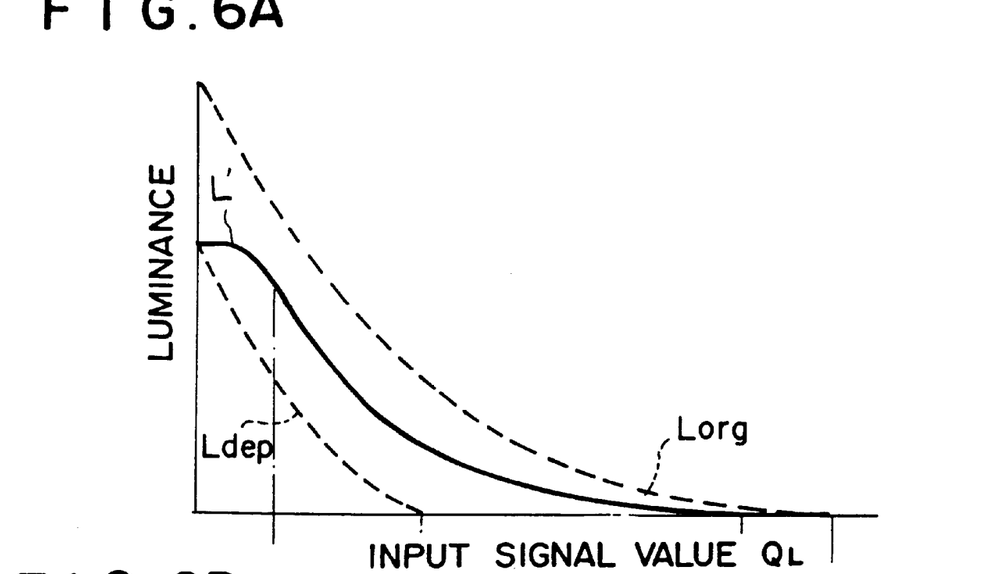
FIG. 6A is a graph showing a further different example of luminance characteristics of a CRT display device after being converted in accordance with a corrected gradation converting table.
Figure 6B:
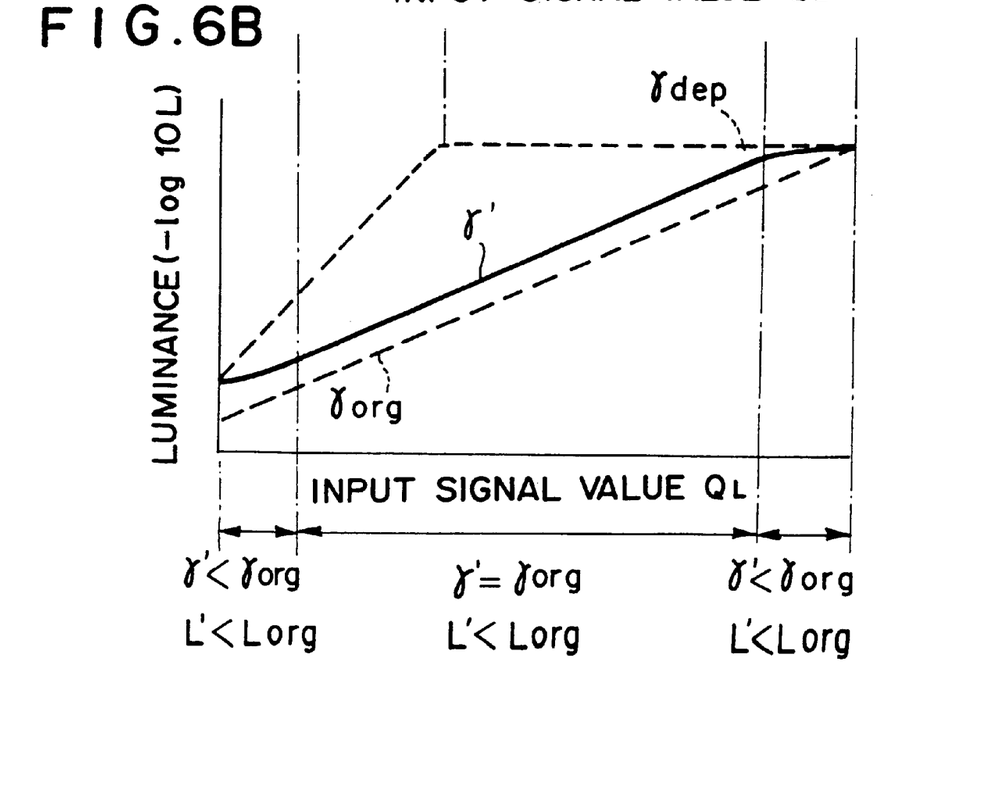
FIG. 6B is a graph showing a further different example of gradation characteristics of the CRT display device after being converted in accordance with the corrected gradation converting table.
Figure 7A:
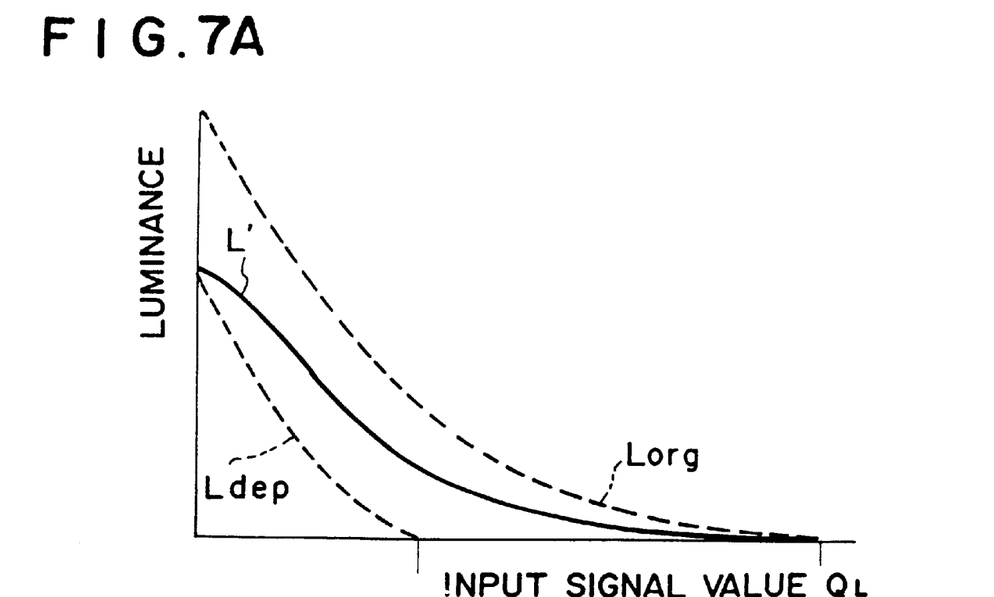
FIG. 7A is a graph showing a still further different example of luminance characteristics of a CRT display device after being converted in accordance with a corrected gradation converting table.
Figure 7B:
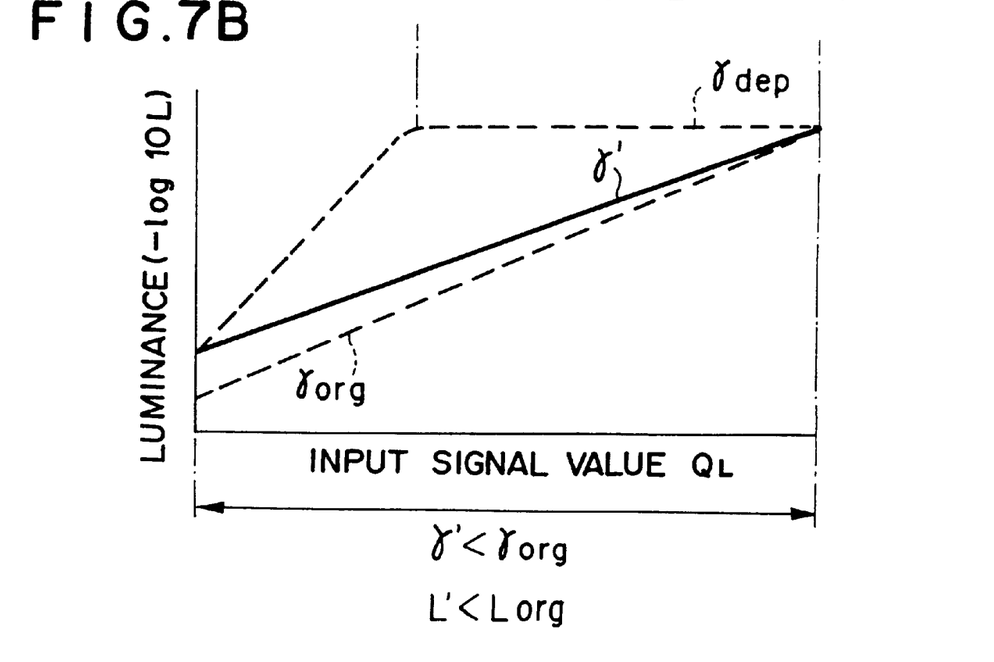
FIG. 7B is a graph showing a still further different example of gradation characteristics of the CRT display device after being converted in accordance with the corrected gradation converting table.

After the amount of depletion of luminance of the CRT display device 2 has been detected by the detection means 3, the table selecting means 5 selects a desired corrected gradation converting table from the plurality of the corrected gradation converting tables, which are stored in the storage means 4. The selection of the corrected gradation converting table is carried out in the manner described below. FIG. 4A is a graph showing an example of luminance characteristics of the CRT display device 2 after being converted in accordance with a corrected gradation converting table, and FIG. 4B is a graph showing an example of gradation characteristics of the CRT display device 2 after being converted in accordance with the corrected gradation converting table. FIG. 5A is a graph showing a different example of luminance characteristics of the CRT display device 2 after being converted in accordance with a corrected gradation converting table, and FIG. 5B is a graph showing a different example of gradation characteristics of the CRT display device 2 after being converted in accordance with the corrected gradation converting table. FIG. 6A is a graph showing a further different example of luminance characteristics of the CRT display device 2 after being converted in accordance with a corrected gradation converting table, and FIG. 6B is a graph showing a further different example of gradation characteristics of the CRT display device 2 after being converted in accordance with the corrected gradation converting table. FIG. 7A is a graph showing a still further different example of luminance characteristics of the CRT display device 2 after being converted in accordance with a corrected gradation converting table, and FIG. 7B is a graph showing a still further different example of gradation characteristics of the CRT display device 2 after being converted in accordance with the corrected gradation converting table. In these drawings, Lorg represents the initial luminance characteristics of the CRT display device 2, and $\gamma$org represents the initial gradation characteristics. Also, Ldep represents the luminance characteristics of the CRT display device 2 after being depleted, and $\gamma$dep represents the gradation characteristics after being depleted. Further, L' represents the luminance characteristics after being converted in accordance with the corrected gradation converting table, and $\gamma$' represents the gradation characteristics after being converted in accordance with the corrected gradation converting table.

Figure 2:
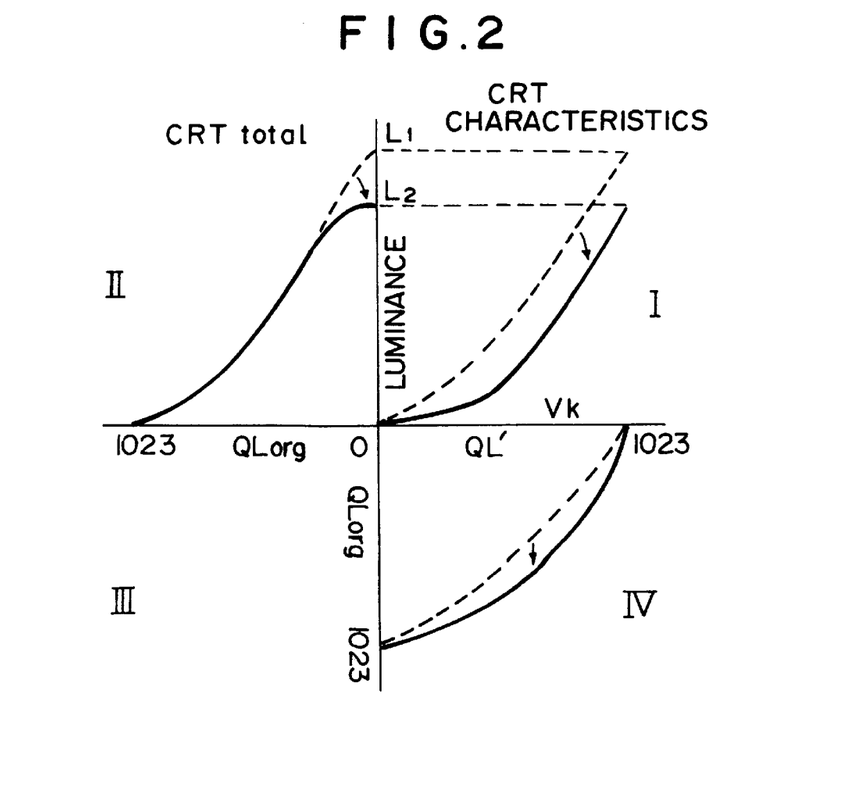
FIG. 2 is a graph showing the gradation characteristics of a CRT display device and a gradation converting table.

In cases where the region of interest in the image, which is represented by the image signal S, is located in the high image density region, i.e. the low luminance region, as in the chest image or a mamma image, the gradation characteristics indicated by the broken line in the fourth quadrant in FIG. 2 is changed to the gradation characteristics indicated by the solid line. Alternatively, in such cases, a desired CRT gradation correcting table is selected from among a plurality of CRT gradation correcting tables as shown in the fourth quadrant in FIG. 2, which have been determined previously in accordance with the amount of depletion of luminance. In this manner, as illustrated in FIG. 4B, the gradation characteristics are set such that the gradation of the low luminance region (i.e., the high image density region) may be kept. With the gradation shown in FIG. 4B, in the high luminance region (i.e., the low image density region), $\gamma$'<$\gamma$org, L'<Lorg, and the gradation characteristics become soft. However, in the region of the middle luminance to the low luminance (i.e., in the region of the middle image density to the high image density), which it is necessary to view, $\gamma$'=$\gamma$org, L'=Lorg, and thus the gradation characteristics and the luminance characteristics, which are equivalent to those before the luminance of the CRT display device 2 is depleted, can be obtained. Therefore, even if the CRT display device 2 deteriorates, a reproduced image having good image quality, in which the gradation in the low luminance region (i.e., the high image density region) is kept sufficient, can be obtained.

In cases where the region of interest in the image, which is represented by the image signal S, is located in the low image density region, i.e. the high luminance region, as in the bone image, the gradation characteristics indicated by the broken line in the fourth quadrant in FIG. 2 is changed, or a desired corrected gradation converting table is selected from among a plurality of corrected gradation converting tables as shown in the fourth quadrant in FIG. 2, which have been determined previously in accordance with the amount of depletion of luminance. In this manner, the ultimately obtained gradation characteristics (expressed in the second quadrant in FIG. 2) are set to be identical with the gradation characteristics shown in FIG. 5B. With the gradation shown in FIG. 5B, in the low luminance region (i.e., the high image density region), $\gamma$'<$\gamma$org, L'<Lorg, and the gradation characteristics become soft. However, in the high luminance region (i.e., in the low image density region), which it is necessary to view, $\gamma$'=$\gamma$org, L'<Lorg, and thus the gradation characteristics, which are equivalent to those before the luminance of the CRT display device 2 is depleted, can be obtained. Therefore, even if the CRT display device 2 deteriorates, a reproduced image having good image quality, in which the gradation in the region of the high luminance (i.e., the low image density) to the middle luminance is kept sufficient, can be obtained.

In cases where the region of interest in the image, which is represented by the image signal S, is located in the middle image density region, i.e. the middle luminance region, the gradation characteristics indicated by the broken line in the fourth quadrant in FIG. 2 is changed, or a desired CRT gradation correcting table is selected from among a plurality of CRT gradation correcting tables as shown in the fourth quadrant in FIG. 2, which have been determined previously in accordance with the amount of depletion of luminance. In this manner, the ultimately obtained gradation characteristics are set to be identical with the gradation characteristics shown in FIG. 6B. With the gradation shown in FIG. 6B, in the low and high image density regions, $\gamma$'<$\gamma$org, L'<Lorg, and the gradation characteristics become soft. However, in the middle image density region, which it is necessary to view, $\gamma$'=$\gamma$org, L'<Lorg, and thus the gradation characteristics, which are equivalent to those before the luminance of the CRT display device 2 is depleted, can be obtained. Therefore, even if the CRT display device 2 deteriorates, a reproduced image having good image quality, in which the gradation in the middle image density region is kept sufficient, can be obtained.

In cases where the contrast of the entire image density region is to be adjusted to be uniform without the gradation becoming insufficient, the gradation characteristics indicated by the broken line in the fourth quadrant in FIG. 2 is changed, or a desired CRT gradation correcting table is selected from among a plurality of CRT gradation correcting tables as shown in the fourth quadrant in FIG. 2, which have been determined previously in accordance with the amount of depletion of luminance. In this manner, the ultimately obtained gradation characteristics are set to be identical with the gradation characteristics shown in FIG. 7B. With the gradation shown in FIG. 7B, in the entire image density region, $\gamma'<\gamma \text{org}$, $L'<L\text{org}$, and the gradation characteristics become soft. However, the gradation characteristics can be adjusted to be uniform over the entire image density region. Therefore, even if the CRT display device 2 deteriorates, a reproduced image, in which the gradation is kept sufficient in the entire image density region, can be obtained.

In the aforesaid embodiment, the selection of the corrected gradation converting table may be carried out manually. Alternatively, the corrected gradation converting table may be selected automatically in accordance with the information represented by the image signal S, the information accompanying the image signal, the information obtained by carrying out a measurement process on the image signal, or the like. As another alternative, the amount of depletion of luminance of the CRT display device 2 may be detected when the operation of the image displaying apparatus is started, and the corrected gradation converting table may be selected simultaneously with the start of the image displaying apparatus.

Figure 9:
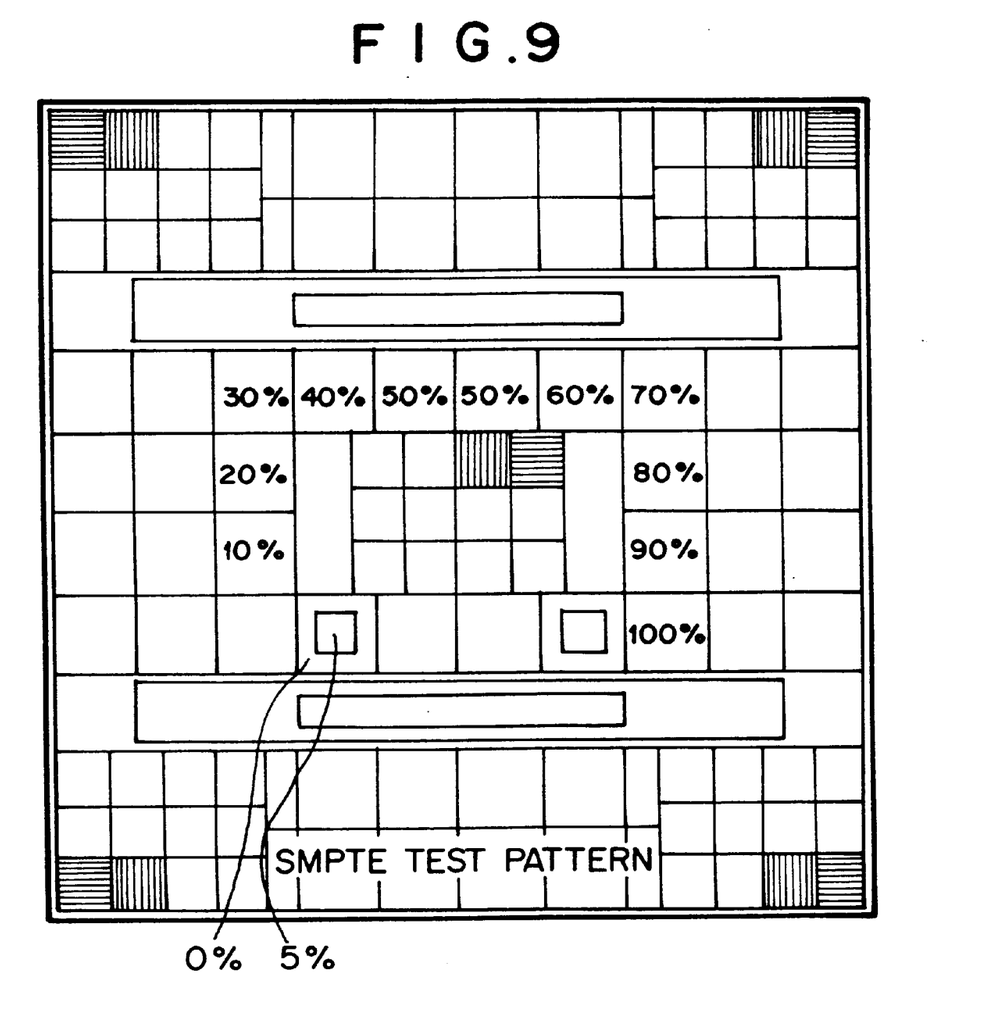
FIG. 9 is an explanatory view showing an SMPTE pattern.

Also, in the embodiment described above, the amount of depletion of luminance of the CRT display device 2 is detected by detecting the anode current at the tube surface of the CRT display device 2. However, the image displaying method and apparatus in accordance with the present invention are not limited to the detection of the anode current. As illustrated in FIG. 8, ordinarily, depletion of luminance appears as insufficient gradation at the low luminance region (i.e., the high image density region). Therefore, for example, an image having a low level of contrast in the low luminance region as in an SMPTE pattern may be displayed, and depletion of luminance may be monitored in accordance with whether the contrast of the low luminance region can or can not be perceived. The SMPTE pattern is the pattern shown in FIG. 9 and is recommended by the U.S. Society of Motion Picture and Television Engineers as a test pattern for the quality control of medical images. The test pattern was ratified by the North America Radiological Society and recommended by the society for the quality control of CRT display devices for diagnosis. As another alternative, the luminance of the image displayed on the CRT display device may be directly measured, and depletion of luminance may thereby be monitored.

In the aforesaid embodiment, the CRT display device 2 serving as the light emission display means is employed as the image displaying means. However, the image displaying method and apparatus in accordance with the present invention are not limited to the use of such a displaying means, and one of various other image displaying means, such as a liquid crystal display device, may be employed.

What is claimed is:

1. An image displaying method, wherein a gradation converting process is carried out on an image signal in accordance with a predetermined gradation converting table, and a visible image, which is represented by an image signal having been obtained from the gradation converting process, is displayed on an image displaying means, the method comprising the steps of:

i) detecting an amount of depletion of luminance of the image displaying means, said depletion changing luminance characteristics of the image displaying means, and     correcting the gradation converting table in accordance with said detected amount of depletion of luminance and an image density of an image to be reproduced such that the depletion of luminance of the image displaying means is substantially compensated.

2. A method as defined in claim 1 wherein a corrected gradation converting table, which is obtained from the correction of the gradation converting table, has characteristics for converting the gradation of the image signal such that the image information represented by a predetermined level of the image signal may be displayed on the image displaying means and with approximately the same level of gradation as the level of gradation, which is displayed on the image displaying means before the luminance of the image displaying means is depleted.

3. A method as defined in claim 1 wherein a corrected gradation converting table, which is obtained from the correction of the gradation converting table, has characteristics for converting the gradation of the image signal such that the gradation of the image signal displayed on the image displaying means may become linear over the entire range of the image signal.

4. An image displaying apparatus, wherein a gradation converting process is carried out on an image signal and in accordance with a predetermined gradation converting table, and a visible image, which is represented by an image signal having been obtained from the gradation converting process, is displayed on an image displaying means, the apparatus comprising:

i) a detection means for detecting an amount of depletion of luminance of the image displaying means, said depletion changing luminance characteristics of the image displaying means,     ii) a storage means for storing information representing at least a single corrected gradation converting table, which has been determined previously in accordance with the amount of depletion of luminance, and     iii) a selection means for selecting a corrected gradation converting table from said storage means and in accordance with said detected amount of depletion of luminance and an image density of an image to be reproduced.

5. An apparatus as defined in claim 4 wherein the corrected gradation converting table has characteristics for converting the gradation of the image signal such that the image information represented by a predetermined level of the image signal may be displayed on the image displaying means and with approximately the same level of gradation as the level of gradation, which is displayed on the image displaying means before the luminance of the image displaying means is depleted.

6. An apparatus as defined in claim 4 wherein the corrected gradation converting table has characteristics for converting the gradation of the image signal such that the gradation of the image signal displayed on the image displaying means may become linear over the entire range of the image signal.

* * * * *